Dec. 23, 1952     D. O. ELLING ET AL     2,622,914
GAMBREL
Filed Oct. 27, 1947
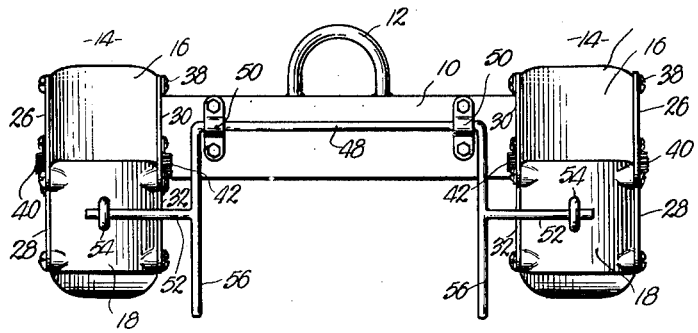
Fig. 1.
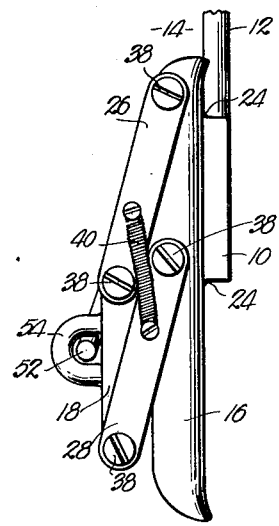
Fig. 2.
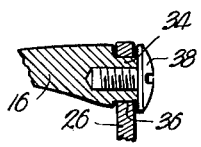
Fig. 6.
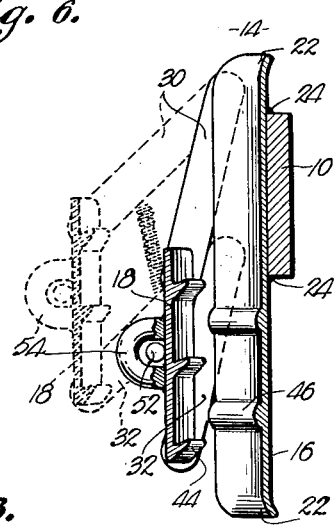
Fig. 5.
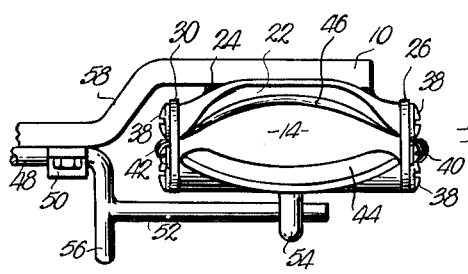
Fig. 3.
Fig. 4.
INVENTORS.
Delmar O. Elling
Asa L. Slye
BY
ATTORNEY.

Patented Dec. 23, 1952

2,622,914

UNITED STATES PATENT OFFICE 2,622,914

GAMBREL

Delmar O. Elling and Asa L. Slye,
Pattonsburg, Mo.

Application October 27, 1947, Serial No. 782,410

1 Claim. (Cl. 294—79)

This invention relates to slaughtering animals for market and more particularly to apparatus for facilitating such operation, in the form of a gambrel or device for suspending carcasses while butchering takes place.

The most important object of this invention is the provision of a gambrel having as a part thereof a pair of specially formed clamps for grasping the legs of the carcass, thereby supplanting the conventional method of incising the hock and utilizing the tendons thereof to support the animal on the gambrel.

Another important object of this invention is the provision of a gambrel having clamps capable of progressively grasping the animal's hock tighter as the same tends to move downwardly by its inherent weight while suspended.

A further object of this invention is to provide clamps of the aforesaid character having ribs so formed and disposed as to not break the animal's hide or otherwise injure the hock, and yet capable of compensating automatically with shrinkage of the hock, thereby remaining operative during all conditions and through any changes of the carcass prior to final disposition.

Other objects of this invention include the manner in which a pair of plates is used to form the clamps, one being swingable from the other in a vertical arc to accomplish the aforesaid efficient holding action; the way in which said swingable plate is yieldably held against the animal's hock; and the manner in which a quickly and easily manually operable actuating means is provided for the clamps.

Other equally important objects will be made clear or become apparent during the course of the following specification, reference being had to the accompanying drawing, wherein:

Figure 1 is a front elevational view of a gambrel and leg holding clamp assembly for slaughtered animals made in accordance with our present invention.

Fig. 2 is an enlarged and elevational view thereof.

Fig. 3 is an enlarged, fragmentary front elevational view similar to Fig. 1.

Fig. 4 is an enlarged, fragmentary top plan view thereof.

Fig. 5 is a cross-sectional view taken on line V—V of Fig. 3; and

Fig. 6 is a fragmentary, detailed, cross-sectional view taken on line VI—VI of Fig. 3.

Heretofore, slaughter houses generally and other preparers of meat products have used the old method of suspending the animals to be butchered by first forming a slit in the animal's rear hocks, particularly hogs, exposing the tendon. The gambrel used was then either inserted between the tendon and bone or hooked over the tendon, the latter being sufficient to support the animal when the gambrel was raised to elevate the animal to desired heights for slaughtering and subsequent storing in freezing compartments.

This method is not only slow but requires extra workers. Furthermore, and more important, such hocks, once exposed to dirt and filth, cannot by law be used by the packers as food products. Attempts have been made to overcome these disadvantages but no gambrel has been made that will effectively support the animal after shrinkage occurs during cooling steps and at the same time not render the hocks unusable for meat products.

In the drawing a support broadly designated by the numeral 10 constitutes an elongated bar having a length substantially the same as the distance between the animal's hocks when spread apart the desired distance. A loop 12, welded or otherwise affixed to support 10 midway between its ends extends upwardly for connection with the usual type of elevated track used in slaughter houses.

A pair of clamping assemblies 14 at each end of support 10 are of identical character and include a pair of plates 16 and 18. Each of these plates 16 and 18 is arcuate in cross section as clearly shown in Fig. 4, the plates being in opposed relation and being curved outwardly from each other. The plate 18 is appreciably shorter than the plate 16 and each end of the latter is beveled outwardly as at 22 to facilitate insertion and removal of the animal's hock.

The plate 16 is welded or otherwise secured to support 10 intermediate the ends of its outermost face as at 24 and is disposed substantially perpendicular to the longitudinal edges of support 10. Two pairs of links 26 and 28, and 30 and 32, interconnect the plates 16 and 18.

One end of all the links 26, 28, 30 and 32 is pivotally secured to plate 16 while the opposite ends thereof are pivotally attached to the plate 18. Fig. 6 of the drawing shows clearly the manner of mounting these links and includes a laterally extending embossment 34 pivotally mounted in an opening 36 in the corresponding link 26, 28, 30 or 32. The embossments 34 are each provided with an internally threaded bore for receiving a screw or the like 38, and have a length greater than the thickness of the corresponding link whereby to present clearance when screws 38 are tightly threaded into place.

Links 26 and 28 are substantially parallel as are the links 30 and 32, and are disposed on the plates 16 and 18 to be at an angle as shown in Fig. 2 when the plates 16 and 18 are together. A spring 40 interconnects links 26 and 28 intermediate their ends and a spring 42 similarly disposed on links 30 and 32, yieldably maintain plate 18 at one end of its path of travel against plate 16.

A number of transverse, upturned, relatively sharp ribs 44 are formed on the innermost face of the plate 18, while plate 16 has a number of rounded transverse ribs 46 formed on its innermost face, all as is clear in Fig. 5.

Actuating means for the clamp assemblies 14 includes a U-shaped lever 48, having its bight pivotally secured to the face of support 10 having assemblies 14 thereon by a pair of brackets 50. Each of the legs of lever 48 has an out-turned arm 52 thereon that extends laterally and loosely through an eyelet 54 on the outermost face of the proximal plate 18.

In other words, each plate 18 has an eyelet 54 received by an arm 52 on the lever 48, and each leg of lever 48 projects beyond the corresponding arm 52, to present hand grips 56. As shown in Fig. 4, the support 10 is offset at each end thereof as at 58 to accommodate the clamp assemblies 14 and thereby lend balance to the gambrel.

In operation, the plates 18 are simultaneously moved from the full line position to the dotted line position shown in Fig. 5 by grasping either grip 56 and swinging lever 48 outwardly as the same pivots in brackets 50. The two hocks of the animal are placed between the two plates 16 and 18 and lever 48 released to permit springs 40 and 42 to move plates 18 to grasping relationship with the hocks. The animal may then be suspended by raising support 10 upwardly to a position where loop 12 may be engaged with the elevated track or other support.

The weight of the suspended animal will pull plates 18 toward the plates 16 and a tight grip upon the hock will be effected. Obviously the heavier the particular animal being suspended, the tighter the clamping engagement on the animal's hocks. This is accomplished because of the vertically arcuate path of travel imparted to the clamp 18 by the pairs of links 26, 28, 30 and 32.

As the animal tends to move downwardly because of the weight, the rounded ribs 46 of the stationary plate 16 will permit limited slippage of the hock, thereby causing plate 18 to move closer toward clamp 16 and cause the ribs 44 to bite more tightly into the hide and flesh of the hock. This is particularly true when the hock begins to shrink, which is usually true when the carcass is conveyed into refrigerators to hang while cooling and prior to final cutting, curing and packing.

Dislodging of the suspended carcass is also easily accomplished from either end of the gambrel by grasping either of the grips 56 of lever 48.

It is to be noted that the clamping assemblies 14 may be used with supports differing from that shown at 10, and also, actuating means different from lever 48 may be utilized if desired. It is for this reason that springs 40 and 42 are shown on the clamp assemblies 14. In lieu thereof, a spring or springs may well be disposed interconnecting the lever 48 and the support 10 to yieldably maintain plates 18 biased toward plates 16.

Manifestly, when the gambrel just described is used, hocks of slaughtered animals will pass all food inspections and considerable savings to those in the slaughtering field will be experienced. Many advantages in addition to those enumerated above will become apparent to those skilled in the art through employment of the device forming the subject matter hereof, and therefore it is desired to be limited only by the spirit of this invention and scope of the appended claim.

Having thus described the invention, what is claimed as new and desired to be secured by Letters Patent is:

In a gambrel for suspending carcasses, a clamp comprising a pair of opposed, elongated, transversely arcuate plates each having gripping means thereon, said plates being movable relatively toward and away from each other and being adapted when apart to receive therebetween a portion of the carcass to be suspended; and means interconnecting said plates for guiding one of the plates through an arcuate path of travel as the same is moved toward and away from the other plate, whereby said gripping means of the plates tightly engage said portion of the carcass as the gambrel is moved to a position for suspending said carcass, said interconnecting means comprising two pairs of links each pivotally joined to each of said plates respectively along the longitudinal edges thereof, the links of each pair being movable into and out of parallelism, said plates being parallel throughout the relative movement thereof; and means for yieldably maintaining said one plate biased toward said other plate, said yieldable means comprising at least one spring interconnecting the links of one pair thereof, the said gripping means comprising a plurality of elongated transverse ribs on proximal faces respectively of said ribs being longitudinally arcuate and conforming arcuately with said plates, presenting an elongated oval space therebetween.

DELMAR O. ELLING.
ASA L. SLYE.

REFERENCES CITED

The following references are of record in the file of this patent:

UNITED STATES PATENTS

| Number | Name | Date |
|---|---|---|
| 801,377 | Hardesty | Oct. 10, 1905 |
| 846,157 | Stephens | Mar. 5, 1907 |
| 988,587 | Morse | Apr. 4, 1911 |
| 1,044,060 | Lace | Nov. 12, 1912 |
| 1,107,467 | Walsh | Aug. 18, 1914 |
| 1,148,681 | Hoogenwoning | Aug. 3, 1915 |
| 1,184,106 | Klein | May 23, 1916 |
| 1,289,995 | Wrage | Dec. 31, 1918 |
| 1,412,201 | Westerhaus | Apr. 11, 1922 |
| 1,695,138 | Brainard | Dec. 11, 1928 |
| 1,758,526 | Lewis | May 13, 1930 |

FOREIGN PATENTS

| Number | Country | Date |
|---|---|---|
| 747,884 | France | Apr. 4, 1933 |